(12) United States Patent
Hombert et al.

(10) Patent No.: US 11,123,910 B2
(45) Date of Patent: Sep. 21, 2021

(54) CALENDERING FACILITY FOR REINFORCEMENT PLIES FOR TIRES

(71) Applicant: COMPAGNIE GENERALE DES ETABLISSEMENTS MICHELIN, Clermont-Ferrand (FR)

(72) Inventors: Christophe Hombert, Clermont-Ferrand (FR); Franck Denavit, Clermont-Ferrand (FR); Francis Aubarede, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 15/776,629

(22) PCT Filed: Dec. 1, 2016

(86) PCT No.: PCT/FR2016/053176
§ 371 (c)(1),
(2) Date: May 16, 2018

(87) PCT Pub. No.: WO2017/093681
PCT Pub. Date: Jun. 8, 2017

(65) Prior Publication Data
US 2018/0326625 A1 Nov. 15, 2018

(30) Foreign Application Priority Data

Dec. 1, 2015 (FR) ...................................... 1561670

(51) Int. Cl.
*B29C 48/07* (2019.01)
*B29C 48/08* (2019.01)
(Continued)

(52) U.S. Cl.
CPC ............ *B29C 48/07* (2019.02); *B29C 43/245* (2013.01); *B29C 43/28* (2013.01); *B29C 43/34* (2013.01);
(Continued)

(58) Field of Classification Search
CPC ......... B29C 47/32; B29C 47/02; B29C 43/34; B29C 43/46; B29C 43/28; B29C 70/50; B29D 30/38
See application file for complete search history.

(56) References Cited

U.S. PATENT DOCUMENTS 3,888,713 A * 6/1975 Alderfer .................. B26D 1/04
156/181
5,800,657 A 9/1998 Hooper et al. ........... 156/244.11
(Continued)

FOREIGN PATENT DOCUMENTS

DE 103 27 679 A1 1/2005
EP 0467560 A2 * 1/1992 ............. B29C 43/24
(Continued)

OTHER PUBLICATIONS

International Search Report issued by WIPO dated Mar. 10, 2017, in connection with International Application No. PCT/FR2016/053176 (in French and English).
(Continued)

*Primary Examiner* — Matthew J Daniels
*Assistant Examiner* — Shibin Liang
(74) *Attorney, Agent, or Firm* — Venable LLP

(57) ABSTRACT

Calendering installation for the production of a reinforcing ply (600) for a tire, which has a frame (100), two extruders (200, 300) for feeding elastomer material, a reinforcing-thread feeding device (400), a calender (500) having a first pair of counter-rotating rollers, with a first working roller (52) and a first shaping roller (51), and a second pair of
(Continued)

counter-rotating rollers, with a second working roller (53) and a second shaping roller (54), wherein a calendaring nip (59) is formed between the working rolls (32, 53) in order to receive a first calendered rubber ply (57) delivered by the first pair of rollers (51, 52), a second calendered rubber ply (58) delivered by the second pair of rollers (53, 54), and the reinforcing threads (45) in order to supply the calendered reinforcing ply (600), which is conveyed to the outlet of the installation via GUIDE ROLLERS (62, 63). According to the invention, the two extruders (200, 300) are superposed and arranged on either side of a horizontal plane P extending at the level of the guide rollers (62, 63).

14 Claims, 3 Drawing Sheets

(51) Int. Cl.
| | |
|---|---|
| *B29C 48/00* | (2019.01) |
| *B29C 48/35* | (2019.01) |
| *B29C 48/285* | (2019.01) |
| *B29C 43/28* | (2006.01) |
| *B29D 29/00* | (2006.01) |
| *B29C 43/24* | (2006.01) |
| *B29C 43/34* | (2006.01) |
| *B29C 43/46* | (2006.01) |
| *B29C 43/58* | (2006.01) |
| *B29L 30/00* | (2006.01) |
| *B29K 105/10* | (2006.01) |
| *B29K 21/00* | (2006.01) |
| *B29L 7/00* | (2006.01) |

(52) U.S. Cl.
CPC .............. *B29C 43/46* (2013.01); *B29C 43/58* (2013.01); *B29C 48/0011* (2019.02); *B29C 48/0021* (2019.02); *B29C 48/08* (2019.02); *B29C 48/2883* (2019.02); *B29C 48/35* (2019.02); *B29D 29/00* (2013.01); *B29C 43/24* (2013.01); *B29C 48/022* (2019.02); *B29C 2043/3433* (2013.01); *B29C 2043/467* (2013.01); *B29C 2043/5825* (2013.01); *B29K 2021/00* (2013.01); *B29K 2105/10* (2013.01); *B29L 2007/001* (2013.01); *B29L 2030/00* (2013.01)

(56) References Cited

U.S. PATENT DOCUMENTS

| | | | |
|---|---|---|---|
| 9,821,524 B2 | 11/2017 | Denavit et al. | .... B29D 30/0681 |
| 2005/0230054 A1* | 10/2005 | Capelle | ................ B29C 43/24 |
| | | | 156/437 |
| 2012/0067476 A1* | 3/2012 | Imhoff | ................... B29D 30/38 |
| | | | 152/209.1 |
| 2015/0000828 A1 | 1/2015 | Heintze | ........................ 156/179 |

FOREIGN PATENT DOCUMENTS

| | | | |
|---|---|---|---|
| EP | 0619170 A2 * | 10/1994 | ........... B29C 70/504 |
| EP | 1 527 439 A1 | 9/2005 | |
| EP | 2 301 738 A1 | 3/2011 | |
| EP | 2 804 750 A1 | 11/2014 | |
| GB | 2 249 521 A | 5/1992 | |
| JP | 2004-314548 A | 11/2004 | |
| WO | WO 2008/099010 A1 | 8/2008 | |

OTHER PUBLICATIONS

Written Opinion published by WIPO dated Jun. 8, 2017, in connection with International Application No. PCT/FR2016/053176 (in French; presently no English translation is available).

* cited by examiner

CALENDERING FACILITY FOR REINFORCEMENT PLIES FOR TIRES

FIELD OF THE INVENTION

The invention relates to the field of the calendering of elastomer mixtures that are more particularly of the type comprising reinforcers and intended for the manufacture of tires.

RELATED ART

As is known, a reinforcing ply for a tire is formed of reinforcing elements covered on both sides with layers of rubbery mixture referred to as calendering layers such that the reinforcing elements cannot be in contact with the outside. The rubbery mixture used may be the same for each layer or different from one layer to the other. The reinforcing elements are metallic cords or textile threads which are mutually parallel and, when assembled with the other plies that make up a tire, are arranged so as to form a given angle with the circumference of the tire.

A reinforcing ply is generally manufactured with the aid of a calender having two rotary calendering rolls, in the nip of which a ply of continuous reinforcing threads, which are regularly spaced apart from one another, circulates, said ply being guided so as to be inserted between two continuous plies of rubbery mixture. On passing through the nip of the calendering rolls, the rubber plies are pressed against one another and fill the spaces between the reinforcing threads so as to form a composite assembly of reinforcing threads and rubber.

Such a rubber ply is generally obtained with another calender that is situated upstream and has two rotary calendering rolls, the nip of which is fed by a bank supplied with a rubbery mixture transported by a conveyor into the region of the calender. Although this functions satisfactorily, it has been found that the width of the rubber plies was much greater than that of the ply of reinforcing threads and, as a result, the ends of the plies have to be cut and reincorporated at the calender. In point of fact, it has been found that hot working the mixture originating from the cut ends multiple times risks impairing the properties of the rubbery material of the ply, this being all the more detrimental, the greater the proportion of the mixture to be reintroduced between the calendering rolls.

The document JP2004314548 proposes a solution to this problem and describes a two-calender device in which each calender is fed upstream with the aid of an extruder which outputs at atmospheric pressure and which is situated at a distance from the nip of the two calendering rolls. Although such feeding makes it possible to better control the width of the calendered ply before the composite reinforcing ply is formed, this is under the condition that each extruder is positioned at a predetermined distance from the nip of the two rolls that it feeds. Such a solution raises problems as regards the arrangement of the extruders within the installation, without which arrangement the dimensional regularity of the plies obtained is no longer met.

The document DE10327679 provides a solution to this problem by proposing a calendering installation having an extruder which outputs directly into the nip of the two calendering rolls for each rubber ply. Two such extruders are arranged one above the other such that the axes of the calendering rolls that they feed are situated in one and the same vertical plane. A fifth roll, the axis of rotation of which is parallel to the axes of rotation of the calendering rolls, makes it possible to join the rubber plies and the reinforcing threads in order to form a composite ply. Although it functions satisfactorily, this installation having extruders at two levels proves to have a large space requirement and the feeding of the extruders requires the presence of several operators.

The document EP1572439 describes another calendering installation of the same type as that in the previous document, but having an arrangement of the two extruders at ground level. In that installation, the reinforcing threads are let in vertically, however, from a higher level and, as a result, it has the same drawbacks as the one in the previous document, since several operators are required to ensure proper operation of the installation.

Furthermore, the document WO 2008/099010 discloses a calendering installation in which the two extruders for feeding the calenders are mutually parallel and inclined with respect to the plane along which the ply passes. In a similar manner to the document JP2004314548, the extruders for feeding the calenders output at atmospheric pressure, forming a bank which, for its part, feeds the nip of the calendering rolls. As a result, the installation of that document has the same drawbacks as that of the previous document. Furthermore, such an arrangement raises problems in terms of space requirement of the installation.

BRIEF DESCRIPTION OF EMBODIMENTS OF THE INVENTION

The objective of the invention is to remedy the drawbacks of the documents described herein and to propose a calendering installation with a small space requirement that makes it possible to obtain reinforcing plies with greater precision.

This objective is achieved with a calendering installation, in particular for the production of a reinforcing ply for a tire, which has a frame, two extruders for feeding elastomer material, a reinforcing-thread feeding device for conveying the reinforcing threads into a calender, the calender having a first pair of counter-rotating rollers, with a first working roller and a first shaping roller, and a second pair of counter-rotating rollers, with a second working roller and a second shaping roller, a first flat die that is provided between the first extruder and the first pair of rollers and projects into a first rubber-ply calendering nip defined between the first pair of rollers, and a second flat die that is provided between the second extruder and the second pair of rollers and projects into a second rubber-ply calendering nip defined between the second pair of rollers, wherein a calendering nip is formed between the working rolls in order to receive a first calendered rubber ply delivered by the first pair of rollers, a second calendered rubber ply delivered by the second pair of rollers, and the reinforcing threads delivered by the reinforcing-thread feeding device in order to supply the calendered reinforcing ply, which leaves the installation via guide rollers, characterized in that the two extruders are superposed and arranged on either side of a horizontal plane P extending at the level of the guide rollers of the reinforcing ply.

The installation uses elastomer-material extruders which output into the nip of calendering rollers, the dies of said extruders projecting into the calendering nip, thereby making it possible, by virtue of feeding under pressure, to obtain plies of rubber with a well-calibrated and constant thickness throughout the operation of said installation.

On account of the use of such extruders, the plies obtained have good geometric precision (in terms of width and thickness of the ply), specifically at a working speed, with preestablished parameters, or at a transient speed. Moreover, the calendering rollers used are smaller and easier to handle, for the purpose of the various adjustments, and to maintain than those of a conventional calender. The reinforcing threads are then inserted between two such calendered rubber plies conveyed into the calendering nip by two adjacent rollers of the calender.

An elastomer or rubber material or mixture is understood to be a raw mixture of thermoplastic polymers or elastomers comprising at least one filler. The reinforcing threads are metallic cords or textile threads which are mutually parallel.

The reinforcing ply obtained with the installation of the invention follows, on exiting the calendering nip, a path contained in a horizontal plane P tangent to the guide rollers of the reinforcing ply that are situated between the two extruders. The horizontal plane in which the reinforcing ply obtained with the installation of the invention travels extends at the level of the calendering nip or is slightly offset with respect thereto. The extruders are superposed, being arranged on either side of this horizontal plane, thereby ensuring a compact structure of the installation. Superposed according to the invention is understood as meaning that the two extruders are situated on one and the same side with respect to a vertical plane extending via the calendering nip.

Advantageously, each extruder outputs the elastomer mixture into the nip formed by a pair of rollers at a pressure greater than atmospheric pressure.

By way of example, the pressure at the outlet of the extruders is between 10 and 70 bar. This feeding of the nip of the two rollers under pressure makes it possible to distribute the mixture properly over the entire calendering width of the ply and thus to obtain a rubber ply with very precise dimensions (width and thickness).

Preferably, the two extruders are arranged substantially equidistantly with respect to the horizontal plane P, for an even more compact structure of the installation.

In an advantageous arrangement of the invention, one of the extruders has a longitudinal axis X-X' and the other extruder has a longitudinal axis Y-Y' and they are arranged such that their axes X-X' and Y-Y' intersect the horizontal plane P, forming with this plane two angles which have one and the same vertex and one common side.

This makes it possible to provide more space between the two extruders compared with a variant in which the extruders are parallel to the horizontal plane and the dies are inclined in the direction of the reinforcing threads.

Preferably, the axes X-X' and Y-Y' make an angle of between 10° and 90° with one another. This allows an arrangement in which the two extruders converge towards the plane P, making it possible to improve the ergonomics of the assembly.

Advantageously, the horizontal plane extending at the level of the guide rollers is situated at a distance of between 800 and 1400 mm from the base of the frame.

This allows a single operator positioned at ground level to prepare the installation for use and also to ensure the operation thereof (for example for monitoring the feed or for intervening in the adjustments) without a device for handling the components thereof.

Preferably, each extruder is arranged such that its feeding device is close to the horizontal plane extending via the rollers, for better access of the operator to the feed hoppers of the two extruders.

Advantageously, each extruder forms, with the flat die and with the two adjacent rollers, an assembly mounted on a common frame. This makes it possible to obtain a unitary assembly for extruding and calendering a rubber ply. Such a unitary assembly is then provided with its own adjustment means and is easy to position with respect to the other components of the installation.

Preferably, the adjacent rollers are held by a bracket mounted in a fixed manner on the common frame, and the extruder is axially movable with respect to the bracket. The bracket for the rollers makes it possible to ensure the functions of maintaining and adjusting the centre-to-centre distance thereof, while making the extruder independent and removable by moving it in axial translation with respect to the bracket, notably for cleaning purposes.

Advantageously, at least one of the extruders is mounted so as to be movable with respect to the frame between a working position and a rest position. This makes it possible to move it away from the region of the calendering nip in order to replace the components that make up the reinforcing ply.

Preferably, the reinforcing-thread feeding device has a roller provided to convey the reinforcing threads into the calender. Such a roller makes it possible to guide the reinforcing threads better to the calendering nip and ensures greater precision of the positioning thereof within the reinforcing ply, especially when it receives the reinforcing threads from a grooved roller situated directly upstream.

Advantageously, said roller is mounted so as to be movable in translation with respect to the calender. This makes it possible to move it away from the calendering nip in order to maintain the installation or to replace various components.

Preferably, the installation has a device for cutting selvedges of the calendered ply, said device being arranged adjacent to the calender. This makes it possible to obtain plies with a very precise width.

Advantageously, the selvedge cutting device comprises two retractable arms that each bear a cutting wheel. This allows the device to be moved away from the calender during the maintenance of the latter.

Advantageously, the installation has a command and control unit which controls the automatic adjustment of the geometry of the reinforcing ply. This makes it possible to easily adjust the thickness of the reinforcing ply, and that of the plies of which it is made up, and the width of said reinforcing ply.

BRIEF DESCRIPTION OF THE DRAWINGS

The invention will be understood better from studying the attached FIGS. 1 to 3, which are provided by way of examples and are in no way limiting, and in which.

DETAILED DESCRIPTION OF EMBODIMENTS OF THE INVENTION

Figure 1:
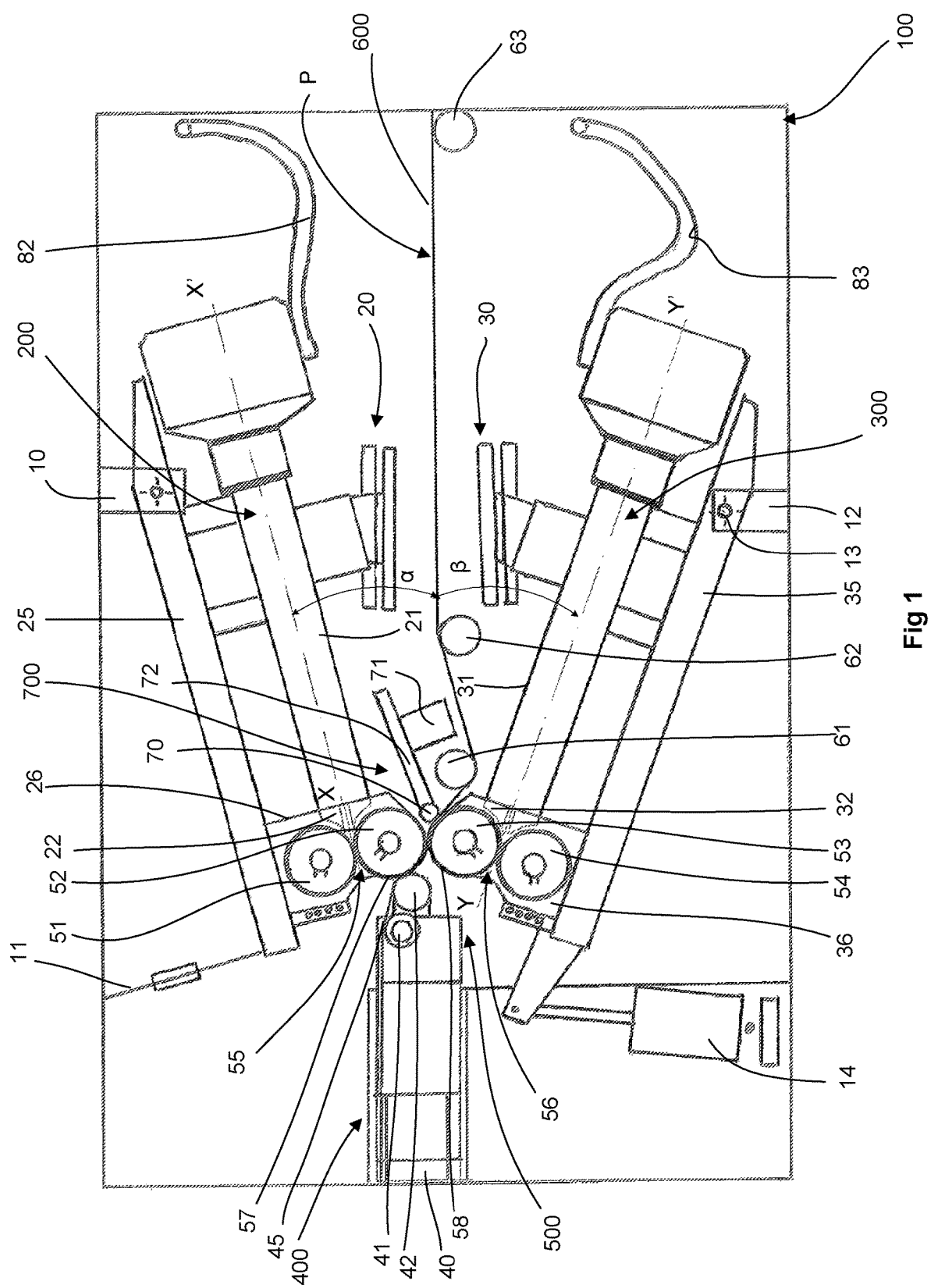
FIG. 1 shows a schematic overview in cross section of a calendering installation according to the invention in a working position.

The calendering installation shown in FIG. 1 comprises a common frame 100 for supporting two extruders 200, 300, a reinforcing-thread feeding device 400 and a calender-forming device 500 in which the reinforcing ply 600 is produced.

The extruders 200, 300 each have a device 20, 30 for feeding an elastomer mixture which is worked in a barrel 21, 31, each comprising an extrusion screw provided to send the elastomer material into a flat die 22, 32. The extruder 200 has a frame 25 which is rigidly secured to the frame 100 with the aid of a flange 10 and a rod 11. The extruder 300 has a frame 35 which is mounted so as to be movable with respect to the frame 100 between a first working position and a second rest position. More particularly, the frame 35 is mounted so as to be able to pivot under the action of an electric actuating cylinder 14 about a horizontal axis 13, situated in a plane parallel to that of the reinforcing ply 600, and supported within a securing flange 12. This makes it possible to free the ply or the reinforcing threads during the preparation of the calendering operation or at the end thereof, in order to carry out cleaning.

The barrel 21, 31 of each extruder encloses a screw that is driven in rotation by a geared motor which is powered via the power cables 82, 83.

The calender 500 comprises a first pair of rollers 51, 52 which rotate in opposite directions, one with respect to the other, about mutually parallel axes that are perpendicular to the axis X-X', and define a first nip 55 between one another, and a second pair of rollers 53, 54 which rotate in opposite directions about mutually parallel axes that are perpendicular to the axis Y-Y' and define a second nip 56 between one another. The rollers 51, 52 each have their own drive and are arranged so as to be movable with respect to one another on a bracket 26, in a direction perpendicular to the axis X-X', such that it is possible to adjust the nip 55. Similarly, the rollers 53, 54 each have their own drive and are arranged so as to be movable on a bracket 36, in a direction perpendicular to the axis Y-Y', such that it is possible to adjust the nip 56 that they define. The elastomer material which is output by the extruder 200 directly into the first nip 55 between two rollers 51, 52, comprising a first working roller 52 and a shaping roller 51, forms a first rubber ply 57. The elastomer material which is output by the extruder 300 directly into the nip 56 between the rollers 53, 54, comprising a working roller 53 and a shaping roller 54, forms a second rubber ply 58.

Advantageously, each extruder 200, 300 outputs the elastomer mixture into the nip formed by each pair of rollers 51, 52 and 53, 54, respectively, at a pressure greater than atmospheric pressure. By way of example, the pressure at the outlet of the extruders is between 10 and 70 bar. Thus, each nip 55, 56 is fed under pressure, making it possible to distribute the mixture uniformly over the width of the ply and to be able to precisely control the thickness of the ply 57 or 58, respectively. The rollers 51, 52, 53, 54 have a small diameter, less than 250 mm, making it possible to apply the nozzle of the output die of the extruder in a sealed manner close to the nip. Furthermore, the shape and size of the arch of the extruder 200, 300 are designed so as to balance the pressures and the flows exiting the extruder over the width of the ply. For example, the cross section of the arch of the extruder is flattened at the centre and widened at its edges in order to achieve the desired effect.

The range of adjustment of the nip 55 and 56 is for example between 0.2 and 4 mm. Each nip 55, 56 is adjustable independently, for example using an electric actuating cylinder which moves one of the two rollers of the nip with respect to the other. Thus, one of the rollers, for example the working roller 52 or 53, respectively, is mounted, with its drive, on a bracket moved by the rod of an electric actuating cylinder in the direction of the shaping roller 51, 54. The movable roller is moved from a first position, in which the two rollers 51, 52 or 53, 54, respectively, are in contact, this position being detected for example by measuring the intensity of the current absorbed by the motor for driving the movable roller in rotation, to a second position, which corresponds to the value of the calendering nip and is obtained by moving the rod of the electric actuating cylinder for actuating the movable roller. This makes it possible to produce rubber plies 57, 58 of variable and very precise thickness, it being possible for the thickness of one ply 57 to be the same as or different from that of the other ply 58.

A calendering nip 59 is formed between the working rollers 52 and 53. The value of the calendering nip 59 is established such that the rubber plies 57, 58 are pressed against one another in order to produce rubber bridges through the reinforcing threads 45 and thus to form the reinforcing ply 600. The nip 59 is adjustable depending on the force which needs to be applied to the reinforcing ply by the rollers. This force is measured by a strain gauge arranged between the end of the rod of the actuating cylinder 14 and the frame 36 and the position of the rod of the actuating cylinder 14 is adjusted as a consequence.

In the example illustrated in the figures, the bracket 26 is secured rigidly to the frame 25 of the extruder 200 and supports the flat die 22 and the two adjacent rollers 51, 52. The same goes for the bracket 36, which is secured rigidly to the frame 35 of the extruder 300 in order to support the flat die 32 and the adjacent rollers 53, 54. Each extruder 200, 300 can be moved axially (i.e. along its longitudinal axis) with respect to its die and to the adjacent rollers for cleaning purposes.

The reinforcing-thread feeding device 400 comprises a bracket 40 which receives the reinforcing threads that arrive from a plurality of spools (not illustrated in the drawings) in the form of a plurality of mutually parallel threads, which are arranged in a horizontal plane, and directs them to a first roller 41 for guiding the reinforcing threads 45, which is grooved. The roller 41 has a plurality of circumferential grooves or slots that are spaced apart from one another by one and the same spacing in the axial direction of the roller and are each intended to accommodate a reinforcing thread. The reinforcing threads 45 are conveyed into the vicinity of the calendering nip 59 by a second thread-laying roller 42 which, for its part, is smooth and inclined slightly in the direction of the calendering nip 59. The rollers 41 and 42 are arranged with their axes of symmetry mutually parallel and parallel to the axes of the calendering rollers 51, 52, 53 and 54. The roller 42 is disposed at a height greater than that of the calendering nip 59 and, as a result, the calendered ply having the reinforcing threads 45 is diverted by a first guide roller 61, which imparts an inclined trajectory thereon, the trajectory being tangent to the rollers 52 and 53 and passing through the calendering nip 59. The calendered ply 600 is then reoriented by a second guide roller 62 and by a third guide roller 63, it being moved between the rollers 62 and 63 in a plane P which is horizontal. The rollers 41 and 42 are movable in horizontal translation together with their bracket 40 with respect to the frame 100 between a working position and a rest position, as will be explained below. The guide rollers 61, 62 and 63 are mounted so as to be free to rotate about axes that are mutually parallel and parallel to the plane P.

A selvedge cutting device 700 is positioned close to the outlet of the calendering nip 59. The cutting device has a body 71 mounted in a fixed manner on the frame 100 and two parallel arms 72 that each bear, at one of their ends, a cutting wheel 70 arranged so as to rotate about a horizontal axis. The arms 72 are mounted so as to be able to move in the widthwise direction of the ply 600 with respect to one another so as to adjust them to the final width of the reinforcing ply 600. The arms 72 are also adjustable so as to be able to be moved towards and away from the reinforcing ply 600. By way of example, it is possible to adjust the width of the calendered ply between 5 and 200 mm with a precision of +/−0.05 mm.

The calendering installation also comprises a command and control unit 800 connected to the various components of the installation, the operation of which it controls. The command and control unit 800 thus has computer means controlled by at least one computer program. This program comprises, in recorded form, code instructions that are able to control the implementation of calendering when it is run on a computer of the installation.

In operation, as is best visible in FIG. 1, the extruder 300 is arranged in the working position, its bracket 35 being brought into the high position by the actuating cylinder 14. The bracket 40 is pushed in the direction of the calender 500 such that the circumference of the second roller 42 is close to the nip 59 of the calender 500. More particularly, the roller 42 is pressed against the first ply 57 so as to come into contact therewith. Its position is advantageously adjusted automatically depending on the thickness of the first ply 57 by a pneumatic actuating cylinder (not illustrated). This actuating cylinder is arranged so as to move the bracket 40 depending on the pressure (measured with the aid of a strain gauge) that the roller 42 exerts on the roller 52. The extruders 200 and 300 are fed with strips of rubber via their feed orifices 20 and 30 and each die 22, 32 feeds the nip of the calendering rollers 51, 52 and 53, 54, respectively. The reinforcing threads 45 are coated with rubber coming from the rollers 52 and 53, passing through the calendering nip. The reinforcing ply obtained is driven in translation in order to exit the installation, by being oriented by the guide rollers 61, 62, 63, and is then wound up on a spool in a storage location (not illustrated in the drawings). In this way, a calendered ply of controlled thickness and width, which travels at high speed, is obtained, the speed being able to be adjusted up to 125 m/min.

Figure 2:
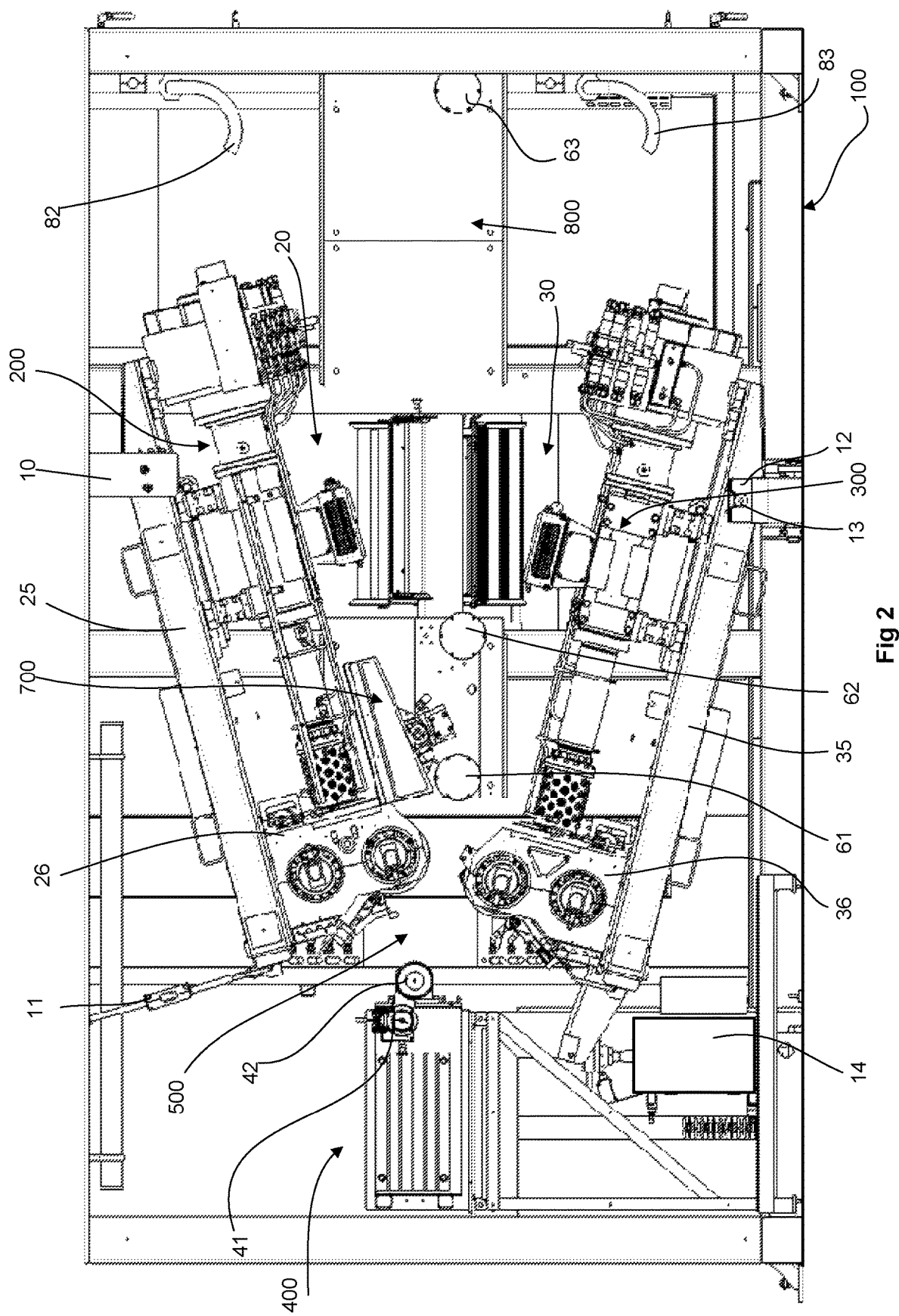
FIG. 2 is a front view of the calendering installation of the invention in a rest position.
Figure 3:
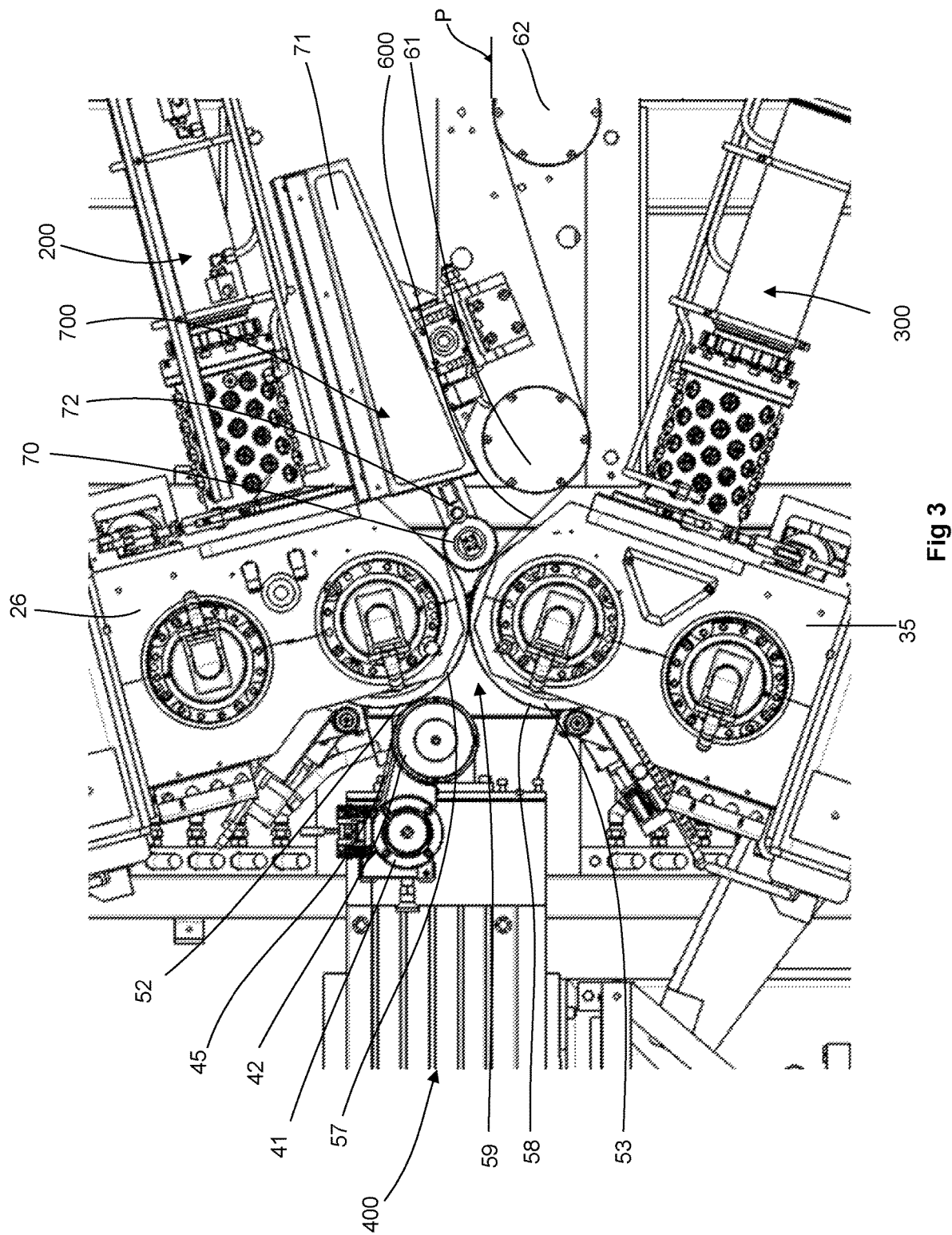
FIG. 3 is a front view on a larger scale of the calender of the invention.

FIG. 2 illustrates the calendering installation of the invention in the rest position, understood to be a position in which the various components have been moved with respect to their working position, for the purpose of cleaning or replacing the reinforcing threads, the elastomer mixture, or for the purpose of cleaning the extruders 200, 300 or replacing some of the components thereof (for example the extrusion screw or the die). In the rest position, the extruder 300 has been lowered by pivoting in the direction of the ground by actuation of the actuating cylinder 14 and is located at a distance from the extruder 200 and from the reinforcing-thread feeding device 400. The bracket 40 for the grooved roller 41 has also been moved away from the calender 500, as have the arms 72 of the cutting device 700. The operator can then replace the reinforcing threads 45, replace the elastomer mixtures by emptying each extruder 200, 300, and maintain or replace the various components of the installation.

The longitudinal axis X-X' of the extruder 200 and the longitudinal axis Y-Y' of the extruder 300 are inclined with respect to a horizontal plane P extending at the level of the guide rollers 62, 63 for the reinforcing ply 600 and each form an angle α or β, respectively, therewith. The angle α or β, respectively, is between 5 and 45° and is preferably around 15°. In the example illustrated in the figures, the angles α and β are the same and the plane P forms a plane of symmetry for the arrangement of the extruders 200 and 300 in the working position. In one variant, the angles α and β are not the same as one another.

Advantageously, the horizontal plane P is situated at a distance of between 800 and 1400 mm from the base of the frame 100. The frame 100 of the installation is generally positioned on the ground, meaning that the components of the installation in which an operator needs to intervene are all located within his reach. Thus, he can fit the reinforcing threads 45 in the grooves of the grooved roller 41, feed the extruders with rubber via the feeding devices 20, 30, collect the rubber of the selvedges after cutting, or during the cleaning of the extruders, etc.

The calendering installation of the invention makes it possible to automatically adjust the thickness of rubber plies and the thickness of the reinforcing ply by controlling, via the command and control unit 800, the movement of the rollers 51, 52 or 53, 54 and that of the extruder 300. The width of the reinforcing ply 600 is also automatically adjustable, by adjusting the distance between the cutting wheels 70 of the cutting device 700. The calendering installation of the invention is thus readily adaptable and automatically adjustable.

This installation is also very compact, on account of the advantageous arrangement of its components, while having good ergonomics for the operator. Moreover, on account of its construction and given the flexibility of adjustment of its components, it makes it possible to obtain a very precise reinforcing ply, while making it possible to choose and adjust the dimensions thereof easily.

The calendering rollers 51, 52, 53, 54 are rigid and each have a diameter of around 250 mm. The diameter of the extruders is around 70 mm. Such an installation makes it possible to manufacture fairly narrow plies, with a width of between 5 and 300 mm with greater precision. Furthermore, on account of its reduced size and the ergonomic arrangement of the feeding extruders, the installation can be set up directly on the ground. Thus, the operator standing on the ground can easily and directly access the region of the calendering nip without it being necessary for the installation to be established in a pit, or to provide raised access for the operator, as in the majority of installations known from the prior art. Furthermore, the operator can easily access all of the intervention points from one side of the machine. Moreover, the various actuators used are electric, making it easier to install the installation in the workshop, for example by avoiding connections to a hydraulic or pneumatic network.

On account of the advantageous arrangement of its components and of the optimized dimensioning of the assembly, the calendering installation of the invention is able to fit in a container transported by a semi-trailer, its dimensions being less than those of the container.

Further variants and embodiments of the invention may be envisaged without departing from the scope of these claims. Thus, it is conceivable to arrange at least one of the extruders parallel to the plane P and the other inclined with respect thereto.

The invention claimed is:

1. A calendering installation for producing a reinforcing ply for a tire, the installation comprising:
   a frame;
   an outlet;
   two extruders supported by the frame, each extruder being structured for feeding an elastomer material;
   a calender;
   guide rollers;
   first and second flat dies; and a reinforcing-thread feeder structured to convey reinforcing threads into the calender, wherein the calender includes: (a) a first pair of counter-rotating rollers formed of a first working roller and a first shaping roller, and (b) a second pair of counter-rotating rollers formed of a second working roller and a second shaping roller, wherein the first flat die is positioned between the first extruder and the first pair of counter-rotating rollers, and wherein the first flat die projects into a first rubber-ply calendering nip located between the first pair of counter-rotating rollers, wherein the second flat die is positioned between the second extruder and the second pair of counter-rotating rollers, and wherein the second flat die projects into a second rubber-ply calendering nip located between the second pair of counter-rotating rollers, wherein a calendering nip is formed between the first and second working rollers and is positioned to receive: (a) a first calendered rubber ply delivered by the first pair of counter-rotating rollers, (b) a second calendered rubber ply delivered by the second pair of counter-rotating rollers, and (c) the reinforcing threads conveyed by the reinforcing-thread feeder, wherein the calendering nip produces a calendered reinforcing ply with a width of between 5 and 300 mm from the first and second calendered rubber plies and the reinforcing threads, wherein the calendered reinforcing ply is conveyed to the outlet via the guide rollers, wherein the first extruder outputs the elastomer material into a first nip, formed by the first pair of counter-rotating rollers, at a pressure greater than atmospheric pressure, and wherein the elastomer material exiting the first extruder and lying in the first nip is kept at a pressure greater than atmospheric pressure, wherein the second extruder outputs the elastomer material into a second nip, formed by the second pair of counter-rotating rollers, at a pressure greater than atmospheric pressure, and wherein the elastomer material exiting the second extruder and lying in the second nip is kept at a pressure greater than atmospheric pressure, wherein the two extruders are superposed and are arranged on opposite sides of a horizontal plane P that extends at a level of the guide rollers, and wherein the reinforcing-thread feeder comprises a thread-laying roller disposed at a height greater than that of the calendering nip, and wherein a first guide roller of the guide rollers is disposed at a height less than that of the calendering nip, whereby the calendered reinforcing ply exits the calendering nip at an inclined trajectory with respect to the horizontal plane P.

2. The installation according to claim 1, wherein the first extruder and the second extruder are arranged substantially equidistant with respect to the horizontal plane P.

3. The installation according to claim 1, wherein the first extruder, the first flat die, and the first pair of counter-rotating rollers form a first assembly mounted on a first common frame, and wherein the second extruder, the second flat die, and the second pair of counter-rotating rollers form a second assembly mounted on a second common frame.

4. The installation according to claim 3, wherein the first pair of counter-rotating rollers are held by a first bracket mounted in a fixed manner on the first common frame, with the first extruder being axially movable relative to the first pair of counter-rotating rollers, and wherein the second pair of counter-rotating rollers are held by a second bracket mounted in a fixed manner on the second common frame, with the second extruder being axially movable relative to the second pair of counter-rotating rollers.

5. The installation according to claim 1, wherein one or both of the first and second extruders is or are movably mounted with respect to the frame, between a working position and a rest position.

6. The installation according to claim 1, wherein the reinforcing-thread feeder further includes another roller.

7. The installation according to claim 6, wherein in the reinforcing-thread feeder, the roller that is disposed at a height greater than that of the calendering nip is translationally movable with respect to the calender.

8. The installation according to claim 1, further comprising a cutter structured to cut selvedges of the calendered reinforcing ply, the cutter being arranged adjacent the calender.

9. The installation according to claim 8, wherein the cutter includes a plurality of retractable arms that each bear a cutting wheel.

10. The installation according to claim 1, further comprising a controller that controls an automatic adjustment of a geometry of the calendered reinforcing ply.

11. The installation according to claim 1, wherein the first extruder outputs the elastomer material into the first nip at a pressure between 10 and 70 bar and wherein the elastomer material exiting the first extruder and lying in the first nip is kept at a pressure between 10 and 70 bar, and wherein the second extruder outputs the elastomer material into the second nip at a pressure between 10 and 70 bar and wherein the elastomer material exiting the second extruder and lying in the second nip is kept at a pressure between 10 and 70 bar.

12. The installation according to claim 11, further comprising a cutter structured to cut a selvedge of the calendered reinforcing ply, wherein the first extruder is axially movable relative to the first flat die and the first pair of counter-rotating rollers, wherein the second extruder is axially movable relative to the second flat die and the second pair of counter-rotating rollers, wherein the second flat die and the second pair of counter-rotating rollers are mounted on a bracket which is fixedly attached to a second frame, wherein the second frame is mounted so as to be pivotably movable around a horizontal axis by an actuating cylinder, wherein the reinforcing-thread feeder includes another roller, wherein the another roller is disposed at a height greater than that of the calendering nip, wherein in the reinforcing-thread feeder, the roller and the another roller are translationally movable in a horizontal direction with respect to the calender by an actuating cylinder that is arranged so as to move a bracket upon which the roller and the another roller are mounted, and wherein the calendered reinforcing ply contacts a second guide roller of the guide rollers at a position closer to the horizontal plane P than a position at which the calendered reinforcing ply contacts the first guide roller.

13. The installation according to claim 12, wherein the first extruder has a longitudinal axis X-X', wherein the second extruder has a longitudinal axis Y-Y', wherein the first extruder is arranged such that the axis X-X' intersects the horizontal plane P at an angle α, wherein the second extruder is arranged such that the axis Y-Y' intersects the horizontal plane P at an angle β, wherein the angle α and the angle β have a same vertex and one common side, wherein the axis X-X' and the axis Y-Y' make an angle of between 10° and 90° with each other, wherein the horizontal plane P is situated at a distance of between 800 mm and 1400 mm from a base of the frame, wherein each of the angle α and the angle β is between 5° and 45°, wherein the first extruder comprises a barrel and a feeding device, the feeding device being configured to feed the elastomer material to the barrel, wherein the feeding device is disposed between the barrel and the horizontal plane P, wherein the second extruder comprises a barrel and a feeding device, the feeding device being configured to feed the elastomer material to the barrel, wherein the feeding device is disposed between the barrel and the horizontal plane P, wherein the first guide roller is closer to the calender than the second guide roller, wherein the cutter includes an arm that bears a cutting wheel and that is movable towards and away from the calendered reinforcing ply, wherein the cutting wheel is disposed between the calendering nip and the first guide roller when the arm has been moved towards the calendered reinforcing ply, wherein the guide rollers further include a third guide roller, wherein the second guide roller and the third guide roller rotate about respective axes that are mutually parallel and that are parallel to the horizontal plane P, wherein the installation further comprises (a) a force measuring gauge and (b) an adjusting cylinder that adjusts a size of the calendering nip in accordance with a measurement of the force measuring gauge, wherein in the reinforcing-thread feeder, (a) the another roller has a plurality of circumferential grooves, and (b) the roller is smooth, wherein extrusion of the elastomeric material is carried out using a structure having a cross section that is flattened at a center thereof and widened at edges thereof, wherein the first rubber-ply calendering nip is adjustable by an actuating cylinder which moves one of the first pair of counter-rotating rollers relative to the other of the first pair of counter-rotating rollers, and wherein the second rubber-ply calendering nip is adjustable by an actuating cylinder which moves one of the second pair of counter-rotating rollers relative to the other of the second pair of counter-rotating rollers.

14. A calendering installation for producing a reinforcing ply for a tire, the installation comprising:

a frame;

an outlet;

two extruders supported by the frame, each extruder being structured for feeding an elastomer material;

a calender;

guide rollers;

first and second flat dies; and a reinforcing-thread feeder structured to convey reinforcing threads into the calender, wherein the calender includes: (a) a first pair of counter-rotating rollers formed of a first working roller and a first shaping roller, and (b) a second pair of counter-rotating rollers formed of a second working roller and a second shaping roller, wherein the first flat die is positioned between the first extruder and the first pair of counter-rotating rollers, and wherein the first flat die projects into a first rubber-ply calendering nip located between the first pair of counter-rotating rollers, wherein the second flat die is positioned between the second extruder and the second pair of counter-rotating rollers, and wherein the second flat die projects into a second rubber-ply calendering nip located between the second pair of counter-rotating rollers, wherein a calendering nip is formed between the first and second working rollers and is positioned to receive: (a) a first calendered rubber ply delivered by the first pair of counter-rotating rollers, (b) a second calendered rubber ply delivered by the second pair of counter-rotating rollers, and (c) the reinforcing threads conveyed by the reinforcing-thread feeder, wherein the calendered reinforcing ply is conveyed to the outlet via the guide rollers, wherein the two extruders are superposed and are arranged on opposite sides of a horizontal plane P that extends at a level of the guide rollers, and wherein the reinforcing-thread feeder comprises a thread-laying roller disposed at a height greater than that of the calendering nip, and wherein a first guide roller of the guide rollers is disposed at a height less than that of the calendering nip, whereby the calendered reinforcing ply exits the calendering nip at an inclined trajectory with respect to the horizontal plane P.

* * * * *